United States Patent
Brawley

(10) Patent No.: US 6,200,614 B1
(45) Date of Patent: Mar. 13, 2001

(54) COMESTIBLE POULTRY PRODUCT AND MEANS AND METHOD FOR PREPARATION FOR COOKING

(76) Inventor: Stephen W. Brawley, 20920 Shaw's Flat Rd., Sonora, CA (US) 95370

( * ) Notice: Subject to any disclaimer, the term of this patent is extended or adjusted under 35 U.S.C. 154(b) by 0 days.

(21) Appl. No.: 09/411,778

(22) Filed: Oct. 4, 1999

(51) Int. Cl.$^7$ ........................................................ A23L 1/31
(52) U.S. Cl. .......................................... 426/134; 426/644
(58) Field of Search ..................................... 426/644, 134

(56) References Cited

U.S. PATENT DOCUMENTS

| | | | |
|---|---|---|---|
| 1,778,485 | * | 10/1930 | Davidson . |
| 2,116,310 | * | 5/1938 | Harvey . |
| 3,300,317 | * | 1/1967 | Franklin ................................. 426/92 |
| 3,594,189 | * | 7/1971 | Panattoni .............................. 426/92 |
| 3,615,692 | * | 10/1971 | Lovell ................................. 426/291 |
| 3,717,473 | * | 2/1973 | Bissett ................................... 99/107 |
| 4,938,988 | * | 7/1990 | Fankhauser ......................... 426/134 |
| 5,250,309 | * | 10/1993 | Gagliardi ............................ 426/644 |
| 5,273,483 | * | 12/1993 | Gagliardi ............................ 426/644 |
| 5,284,669 | * | 2/1994 | Gagliardi ............................ 426/644 |
| 5,368,519 | * | 11/1994 | Curtis ................................. 426/644 |
| 5,442,999 | * | 8/1995 | Meister ................................. 99/426 |

FOREIGN PATENT DOCUMENTS

| | | | |
|---|---|---|---|
| 220748 | * | 3/1986 | (DE) . |
| 2566629 | * | 1/1986 | (FR) .................................... 426/644 |
| 2618999 | * | 8/1987 | (FR) . |
| 11308962 | * | 4/1998 | (JP) . |

OTHER PUBLICATIONS

Constable 1983 Outdoor Cooking Time–Life Books Alexandria VA p. 54–55.*
Anon 1993 Food Trade Review 63(12) 764 (Abstract Only).*
Anon 1993 Food Manufacture 68(11) pp. 50.*

* cited by examiner

Primary Examiner—Carolyn Paden
(74) Attorney, Agent, or Firm—John J. Leavitt

(57) ABSTRACT

Presented is a new product, namely a poultry wing including a plurality of segments, either raw or cooked, and the method and means by which the new product is produced by extending the plurality of segments into longitudinal orientation and thereafter engaging all segments with means for retaining all segments in extended or longitudinal orientation or alignment for processing, packaging, cooking, and consumption. Because of the interconnection of these normally pivotally associated segments of the poultry wing by muscle tissue, when a poultry wing is cooked while these segments are free to pivot in relation to each other, the muscle tissue that interconnects these segments contracts and consequently the segments of the wing are pulled together into substantial parallelism to form a tight interconnected mass that is difficult to cook uniformly, and which is inconvenient to consume because of the need to physically separate the contracted mass. These disadvantages are obviated by extending the segments into alignment while raw, running a skewer through all segments to retain them in alignment, and then prepare them for packaging, freezing or cooking while retained extended and in alignment by the skewer.

11 Claims, 2 Drawing Sheets

Fig_1
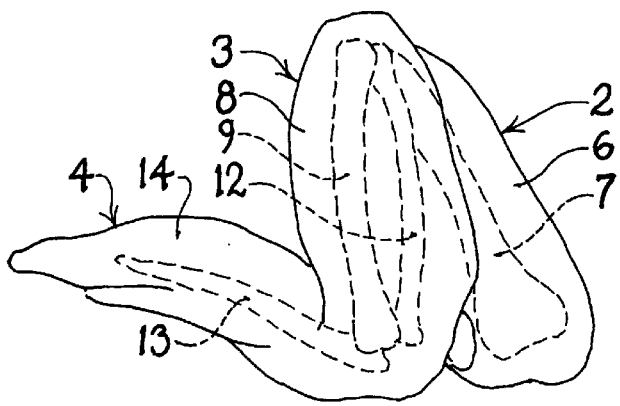
Fig_2
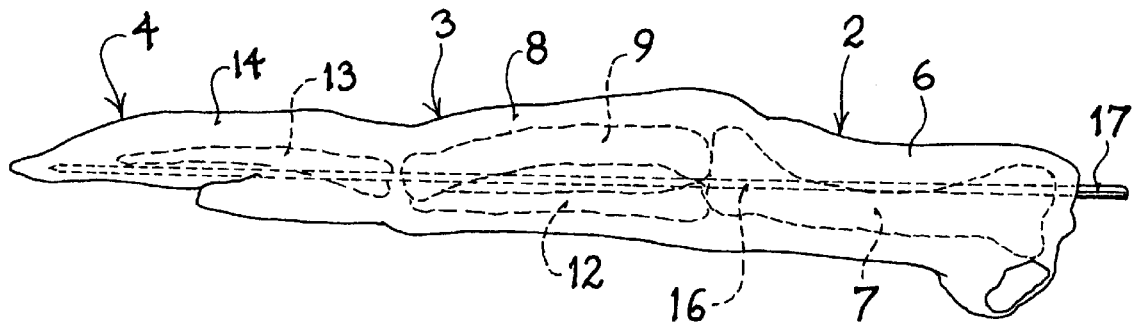

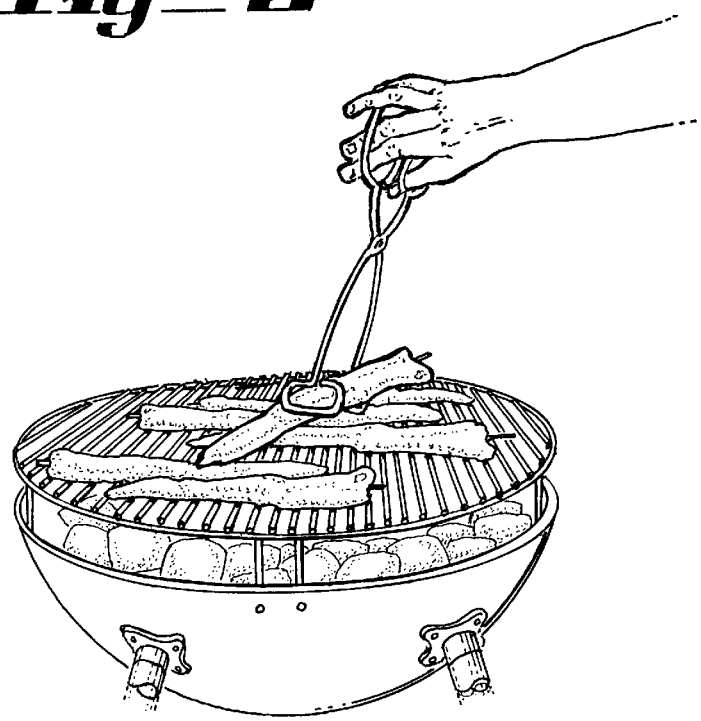
Fig_3
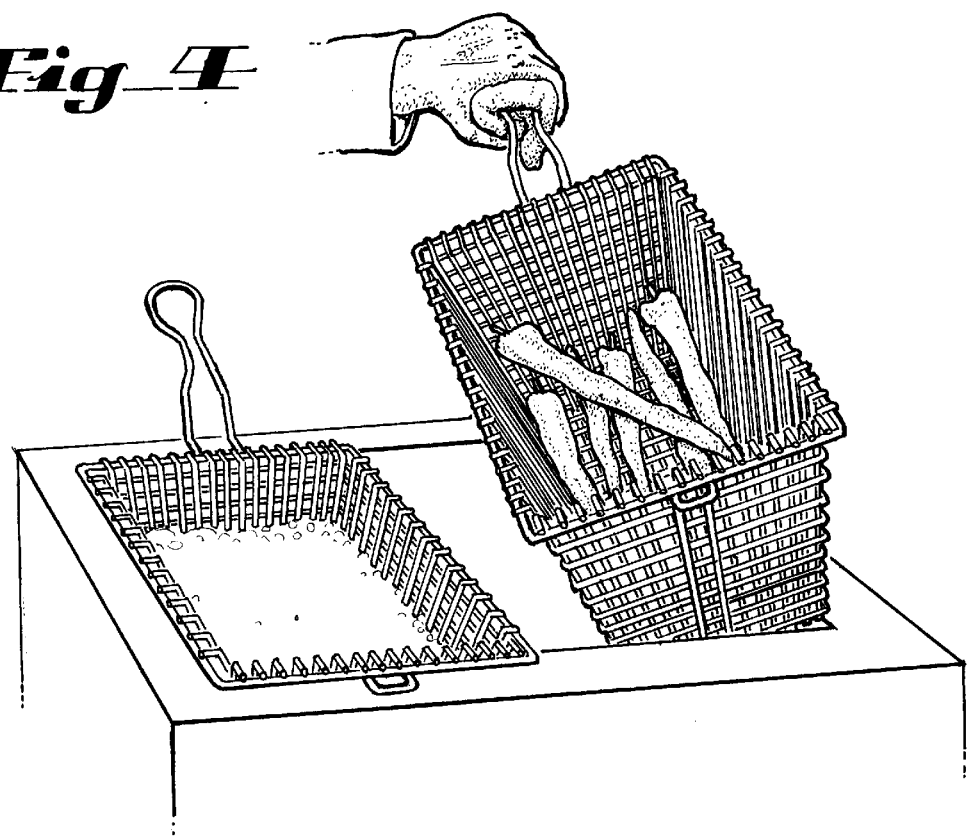
Fig_4

COMESTIBLE POULTRY PRODUCT AND MEANS AND METHOD FOR PREPARATION FOR COOKING

BACKGROUND OF THE INVENTION

1. Field of the Invention

This invention relates to comestible poultry products, and more particularly to comestible poultry wings and a means and method for cooking poultry wings in a manner to facilitate utilization and uniform cooking of all three portions of a poultry wing.

2. Description of the Prior Art

A preliminary patentability and novelty search in connection with this invention has revealed the existence of the following U.S. Pat. Nos.

1,778,485
2,116,310
3,717,473
5,442,999

U.S. Pat. No. 1,778,485 relates to an article of food that does not involve poultry or poultry parts. Specifically, the article of food relates to strips of prepared raw meat such as beef and/or pork, with portions of each strip overlapped and skewered. Chicken flavoring or seasoning is applied to the meat to convey a simulated impression that these articles of food are chicken meat.

U.S. Pat. No. 2,116,310 also relates to an article of food, but here the inventive concept is directed more to the details of construction of the skewer than it is to food product impaled by the skewer. The skewer disclosed by this patent is provided with apertures that may be filled with salt or pepper or other types of seasoning, or which may be porous in a manner to accept the placement of different types of spices and seasonings which will then be transferred to the food product on the skewer.

U.S. Pat. No. 3,717,473 discloses the method of using a plurality of skewers inserted at spaced intervals transversely through an elongaged strip of meat. Prior to cooking, slits are made transversely partially through the strip of meat at locations between the spaced skewers, so that after cooking the strip may be cut through, resulting in each piece of meat being supported on its own skewer.

U.S. Pat. No. 5,442,999 relates to fowl or poultry, but in the sense of retaining one or more whole fowl, such as chickens, on a vertical spit during display, roasting and warming, with portions of the fowl, such as the legs, trussed together.

From the United States patents discussed above, it will become obvious that there is no disclosure or reasonable teaching in any of these patents of a method and means for preparing the three parts of a poultry wing for cooking by piercing the individual parts, in connected tandem, with a single skewer, and then cooking the skewered wing parts in forcibly extended form.

Accordingly, an important object of the present invention is the provision of a method and means for forcibly retaining the three parts of a poultry wing extended in tandem form for cooking.

Another important object of the invention is the provision as an article of manufacture of a comestible raw poultry wing skewered to retain multiple parts of the wing in interconnected extended form for packaging raw and ready for cooking.

A still further object of the invention is the provision as an article of manufacture of a comestible cooked poultry wing skewered to retain the multiple parts of the wing interconnected and in extended form for packaging in cooked form, reheating and consumption.

Another important object of the invention is the provision as an article of manufacture of a comestible raw poultry wing skewered to retain multiple parts of the wing in the interconnected extended form for freezing and packaging.

A still further object of the invention is the provision as an article of manufacture of a comestible cooked poultry wing skewered to retain the multiple parts of the wing interconnected and in extended form for freezing in cooked form and freeze packed in extended form.

The invention possesses other objects and features of advantage, some of which, with the foregoing, will become apparent from the following description and the drawings. It is to be understood that the invention is not limited to the embodiment illustrated and described since it may be embodied in various forms within the scope of the appended claims.

SUMMARY OF THE INVENTION

In terms of broad inclusion, the invention comprises a new product, namely a poultry wing including all three parts or segments, either raw or cooked, and the method and means by which the new product is produced by retaining all three of the parts or segments in extended or tandem alignment for processing, packaging, cooking, and for consumption. The three parts of a poultry wing include the Humerus, the proximal end portion of which is connected to the Deltoid crest. Next in order in a distal direction is the Ulna, the proximal end portion of which is pivotally attached to the distal end portion of the Humerus. The distal end portion of the Ulna is pivotally connected to the proximal end portion of the third segment of the wing, which is made up of the Carpometacarpus, which in turn, is closely associated with five phalanx digits or bones that make up the tip or distal end of the wing. Because of the interconnection of these pivotally associated segments of the poultry wing by muscle tissue, when a poultry wing is cooked while these segments are free to pivot in relation to each other, the muscle tissue that interconnects these three segments contracts and consequently the three parts or segments of the wing are pulled together into substantial parallelism to form a tight interconnected mass that is difficult to cook uniformly, and which is inconvenient to consume because of the need to physically separate the contracted mass. These disadvantages are obviated by extending the three segments into alignment while raw, running a skewer through all three of the segments to retain them in alignment, and then prepare them for packaging, freezing or cooking while retained extended and in alignment by the skewer.

BRIEF DESCRIPTION OF THE DRAWINGS

FIG. 1 is a perspective view illustrating the three segments of the poultry wing severed from the body of the fowl and in the form in which the wing parts or segments are usually cooked.

FIG. 2 is a plan view of the three segments of the poultry wing extended and retained in extended form by the insertion of a skewer through the extended length of the three segments.

FIG. 3 is a perspective view illustrating a plurality of the poultry wings in extended form and retained so by skewers being cooked in extended form on a barbeque grill.

FIG. 4 is a perspective view illustrating a plurality of the poultry wings retained in extended form by skewers, and about to be deep fried in hot cooking oil.

DESCRIPTION OF THE PREFERRED EMBODIMENT

In terms of greater detail, the comestible poultry product and the method and means for preparing it for cooking is described herein in relation to a chicken, but it should be understood that any type of poultry or fowl such as turkeys, geese, ducks, pheasants, etc. are included by the terms "chicken" or fowl or poultry.

As discussed above, and reiterated hereat in the interest of clarity in this description, the wing of a fowl or poultry is composed of three main parts or segments designated generally by the numerals 2, 3 and 4. The segment 2 is the proximal portion of the wing closest to the body of the chicken and contains the greatest amount of edible flesh 6. This proximal segment of the wing contains the Humerus 7, the largest bone extending longitudinally through the segment, with the proximal end portion of the Humerus 7 being normally pivotally connected to the Deltoid and Bicipital crests of the live fowl to thus enable it to raise and flap its wings, or to draw them closely against the side of the body. Embedded in the tissue 6 surrounding and appropriately connected to the Humerus are the tendons, muscles and cartilage that enable the fowl to control the position of its wings.

The distal end portion of the Humerus 7, although embedded in tissue 6, is also pivotally connected to the second or intermediate segment 3 of the wing which includes tissue 8 within which are embedded two bones, a primary bone 9 called the Ulna, and a secondary bone 12 having opposite ends pivotally associated with the opposite ends of the Ulna, but having its major intermediate portion spaced laterally from the intermediate portion of the Ulna, as illustrated in FIGS. 1 and 2. The intermeidate segment, like the proximal segment 2, also contains a substantial portion of the total edible flesh to be found in the wing structure of fowl.

The distal ends of the bones 9 and 12 found in the tissue 8 of the intermediate segment are pivotally arranged with the associated proximal end portion of the assembly of multiple bones designated generally and collectivel by the numeral 13 which are embedded in tissue 14 of the distal segment 4 of the wing structure. This portion of the wing contains the least amount of edible tissue, but is nevertheless tasty to many palates, and is therefore considered a comestible portion of the wing structure. Much of the edible tissue found in this distal segment of the wing structure consists of muscle and cartilage tissue, and it is the presence of this type of tissue that causes the wing tip or distal segment 4 to contract into close proximity with the intermediate and proximal segments when cooked in the conventional manner, i.e., when not restrained from contracting.

Referring to FIGS. 2, 3 and 4 of the drawings, it is seen that the proximal, intermediate and distal segments of the wing, have been extended into substantial axial alignment so that the associated ends of the bones embedded in the tissue of adjacent segments are in close juxtaposition. To retain the three segments in this axial alignment, a skewer 16, sharpened at one end, and which is long enough to penetrate essentially the full length of the three aligned segments, is inserted sharp end first from the proximal end of the proximal segment 2, through the tissue alongside the bone 7 in the segment 2, and continuing into the intermediate segment 3, where it is pushed through the tissue of this segment between the Ulna bone 9 and Radius bone 12.

The skewer 16 is pushed through the tissue with one hand while the other hand holds the wing segments in alignment. Ultimately, the skewer is inserted into the proximal end of the distal segment 4 of the wing, where it passes through the tissue of this segment between the Ulna bone 9 and Radius bone 12.

The skewer 16 is pushed through the tissue with one hand while the other hand holds the wing segments in alignment. Ultimately, the skewer is inserted into the proximal end of the distal segment 4 of the wing, where it passes through the tissue of this segment alongside the multiple bones of this distal segment. A portion 17 of the skewer is left protruding from the proximal end of the proximal segment 2 so that the now skewered segments of the wing may be handled for packaging and/or cooking without contact with the edible raw tissue of the wing.

Experience has demonstrated that the comestible skewered food product thus described may be cooked or grilled over hot coals, as on a barbeque grill as illistrated in FIG. 3 or, alternatively, may be deep fried as illustrated in FIG. 4. In either method of cooking, it has been found that the three segments of the wing remain intact and remain in extended form, and may be consumed directly from the skewer or may be removed from the skewer and then consumed. It has also been found that the three segments, each being wholly exposed during the cooking process, are thoroughly cooked and do not contain tissue that is uncooked because it was shielded from the heat by other adjacent portions of the wing structure.

Having thus described the invention, what is believed to be new and novel and sought to be protected by letters patent of the United States is as follows.

I claim:

1. As an article of manufacture, a comestible poultry product, comprising:
   a) a plurality of normally pivotally connected poultry wing segments arranged in substantial longitudinal alignment; and
   b) means engaging said longitudinally aligned wing segments to retain them in longitudinal alignment.

2. The article of manufacture according to claim 1, wherein said normally pivotally connected poultry wing segments are raw.

3. The article of manufacture according to claim 1, wherein said normally pivotally connected poultry wing segments are cooked.

4. The article of manufacture according to claim 1, wherein said normally pivotally connected wing segments arranged in longitudinal alignment include bones and flesh surrounding said bones.

5. The article of manufacture according to claim 4, wherein said means engaging said longitudinally aligned wing segments to retain them in alignment comprises a skewer embedded in said flesh and extending substantially parallel to said bones.

6. The article of manufacture according to claim 4, wherein three comestible poultry wing segments are arranged in longitudinal alignment, and said means for retaining said wing segments in longitudinal alignment comprises an elongated skewer embedded longitudinally in the three wing segments.

7. The article of manufacture according to claim 1, wherein said means engaging said longitudinally arranged wing segments to retain them in alignment comprises a skewer embedded in said wing segments to retain them in longitudinal alignment.

8. The article of manufacture according to claim 7, wherein a portion of said skewer protrudes from at least one end of the longitudinally arranged wing segments to function as a handle for digitally manipulating the comestible poultry product.

9. The method of manufacturing a comestible poultry product, consisting of:
   a) severing wing structures having a plurality of segments from the body of a fowl at the bicipital crest;
   b) extending the plurality of segments of the wing structure into an elongated orientation; and
   c) thereafter applying means engaging said plurality of wing segments to retain them in longitudinal alignment.

10. The method according to claim 9, wherein said comestible poultry wing segments are raw when said means engaging the segment to retain them in longitudinal alignment is applied.

11. The method according to claim 10, wherein said means engaging said wing segments comprises an elongated skewer that is embedded longitudinally through said plurality of segments to retain them in longitudinal orientation.

* * * * *